Nov. 30, 1965     R. L. JONES ETAL     3,220,401
RADIANT HEATING UNITS
Filed May 21, 1962
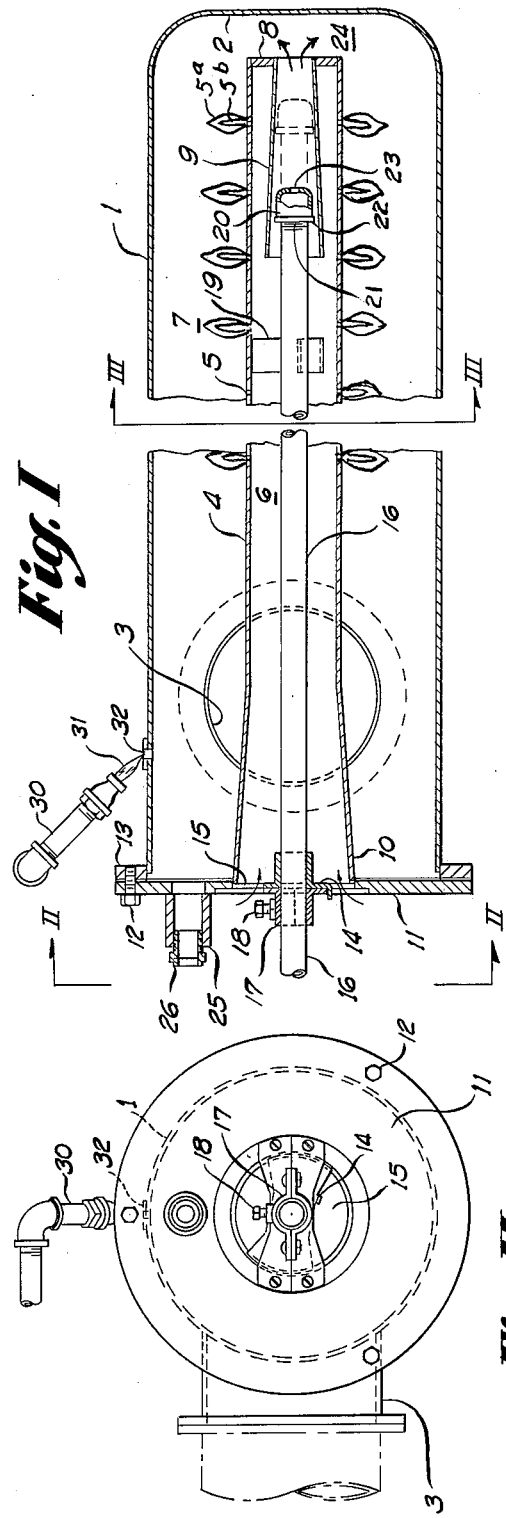
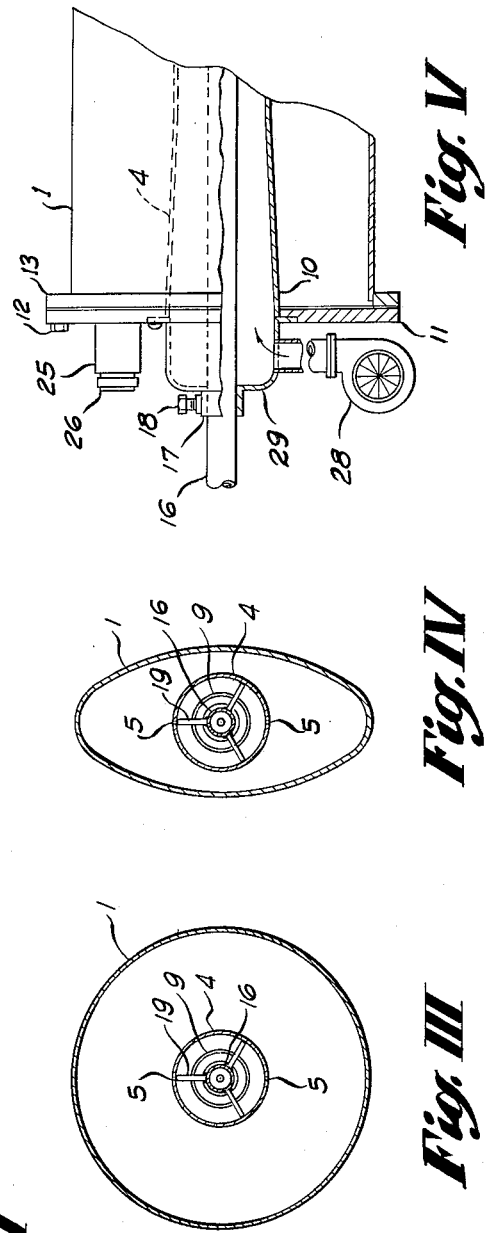
INVENTOR.
Robert L. Jones
and Howard H. Nichols
BY
William B. Jaspert
Attorney.

United States Patent Office 3,220,401
Patented Nov. 30, 1965

3,220,401
RADIANT HEATING UNITS
Robert L. Jones and Howard H. Nichols, Pittsburgh, Pa., assignors to Hazen Engineering Company, Pittsburgh, Pa., a corporation of Pennsylvania
Filed May 21, 1962, Ser. No. 196,154
1 Claim. (Cl. 126—91)

In our former application we have disclosed a radiant heating unit in which the combustion chamber is the space between a metal housing and a combustion air tube disposed within said housing, fuel being supplied by a pipe extending centrally through the combustion air tube and the heat generated in a combustion chamber is radiated from the housing wall to the article being heated without any products of combustion escaping into the heating chamber. We have found that without some control of premixing the primary air with the fuel, there are too many variables in the firing of the fuel and the heating characteristics of the radiant heating tube and the present invention, while utilizing all of the essential features of our former application, additionally provides some improvements particularly in the premixing of the fuel to determine the ratio of primary air to secondary air supporting combustion and the present invention further provides means for viewing and inspecting the firing conditions to determine when the proper ratio of primary and secondary air has been effected.

It is an object of this invention to provide means for regulating the fuel volume and the air volume and air pressure and for regulating the volume of air supply independent of the suction effected by the exhaust of the products of combustion from the combustion area of the radiant tube heater whereby such radiant tube heaters may be individually regulated by the separate air volume and pressure control or where there are a multiple of burners used for a common heating purpose, they may be adjusted simultaneously in groups after such individual adjustments have been made.

It is among the objects of the present invention to provide a radiant tube heater in which a premix cone is provided in the end of the air tube, the nozzle of the cone extending through a closure at the end of said tube, and an adjustable metering disc is provided for varying the annular area between the disc and inner circumference of the cone by moving it to different positions in an axial direction relative to the inclined wall of the cone, the variable annular area determining the volume of premix air supplied to the burner in relation to the secondary air which enters the combustion chamber through perforations provided in the wall of the air tube.

It is a further object of the invention to provide a radiant tube of the above designated character having a peep hole through which the flame characteristics in the combustion chamber can be viewed for the purpose of adjusting the metering disc to obtain the proper premix air-fuel ratio.

It is another object of the invention to provide a radiant tube in which the open end of the air tube is provided with a shutter for controlling the volume of air drawn into the tube.

It is still another primary object of this invention to provide perforations in the air duct contained within the radiant tube to cause the emission of air under pressure into the space between the radiant tube housing and the air tube, thus creating a series of flames extending radially from the air tube, each individual flame having an air cone in the center, the said perforations being spaced to project highly radiant flames against predetermined areas of the radiant tube housing and for a distance along the length of the radiant tube burner to consume all of the combustible material passing from the end of the tube to the exhaust outlet at the forward end of the tube.

The invention will become more apparent from a consideration of the accompanying drawings constituting a part hereof in which like reference characters designate like parts and in which:

FIGURE 1 is a vertical cross-sectional view taken along the longitudinal axis of a radiant tube embodying the principles of this invention;

FIGURE 2 an end elevational view thereof, as shown at 2—2, FIG. 1;

FIGURE 3 a vertical cross section, partially in elevation, taken along the line 3—3, FIGURE 1;

FIGURE 4 a vertical section of a modified form of radiant tube; and,

FIGURE 5 a fragmentary portion of the rear end of a radiant tube heater partially in cross section and partially in elevation, showing a blower connected to the air inlet end of the combustion air tube.

With reference to the several figures of the drawing, the numeral 1 designates the outer housing of the radiant tube heater having a closed end 2 and having an exhaust outlet 3 leading to a stack or to a blower for withdrawing the products of combustion from the tube. Disposed within the tube 1 is a combustion air tube 4 having perforations 5 through which combustion air is drawn and passes radially outward from the inner chamber 6 of the combustion air tube to the combustion area or chamber 7 between the air tube 4 and the outer housing 1. The volume of air drawn through the air tube may be controlled as will be hereinafter explained.

The end of the air tube 4 adjacent the end wall 2 of the outer housing is closed, as shown at 8, and is sealed off with the end of a conical shaped nozzle 9 which may be designated a premix cone. The other end of the air tube 4 flares slightly, as shown at 10, and is secured to a cover plate 11 that is bolted at 12 to a flange 13 provided on the outer housing 1. The opening at the flared end 10 of the air tube is provided with an air shutter 14 with adjustable openings 15 that determines the volume of air drawn into the tube 4 by the exhaust fan communicating with the outlet 3. A fuel or gas tube 16 is disposed in the center of the air tube 4 and extends beyond the closure 11 to a source of gaseous fuel, the fuel tube being secured in a sleeve 17 by a set screw or bolt 18 to whatever position it has been adjusted in relation to the premix cone 9.

The fuel tube 16 is further supported by one or more spacing brackets 19 and an end cap 20 is connected by threads to the threaded end 21 of the fuel tube. The end cap 20 is provided with a flange 22 that is termed a metering disc and an opening 23 is provided in the end of the cap 20 for the emission of a gaseous fuel that passes into the premix cone 9.

The position of the metering disc 22 axially in the premix cone 9 determines the size of the annular area between the metering disc and the inner wall of the cone which allows more or less air to pass from the air chamber 6 of tube 4 into the premix cone and out into the end chamber 24 of the radiant tube. At the same time, gas passes through opening 23 and is premixed with the air that enters around the metering disc and the combustible mixture goes into the end chamber 24 and thence to the combustion chamber 7 surrounding tube 4 where it mixes with secondary air supplied through the perforations 5 of the air tube 4.

A peep site 25 is provided on cover 11 with a site glass 26 for viewing the combustion taking place in the end chamber 24 and in the combustion chamber 7 for the purpose of adjusting the position of the fuel pipe 16 and thereby the metering disc 22 to allow control of the fuel air ratio until the proper firing characteristics are obtained. We have found that by regulating the air supply in the ratio of from 30 to 45% primary air passing around the metering disc 22 and the balance air supplied as secondary air through orifices 5, the proper firing in the combustion chamber 7 is obtained. The products of combustion pass out through the outlet 3 by a suction fan and is evident that the same suction of the fan will draw in the combustion air through the shutter controlled inlets 15.

In the modification shown in FIGURE 5, the air flow and the flow of the products of combustion are controlled by pressure supplied through a blower 28 connected to a bell cover 29 at the end of the air tube 4.

In FIGURE 3, the housing 1, air tube 4 and the fuel tube 16 are all shown as concentrically arranged circular members. In FIGURE 4, the outer tube 1 is oval-shaped and the air tube 4 and fuel pipe 16 are all annular shaped.

In our former application, we have shown the use of a spark plug for igniting the gaseous mixture in the combustion chamber surrounding the air tube, but it is found that in the use of coke oven gas the plug terminals carbonize too rapidly and a pilot gas burner 30, FIGURE 1, can be used to shoot a flame 31 through an orifice 32 in the outer tube or housing of the combustion chamber, as shown.

The pre-mixed air and gaseous fuel that is pierced by the secondary air jets escaping from the perforations 5 nearest the pilot flame 31 will be the first to ignite and produce a flame 5a and as a combustible mixture is produced by the pre-mix inspirated by the secondary air jets along the length of the tube, they will ignite to produce the burner flames 5a all the way back to the last perforation 5 adjacent the closed end 2 of the burner housing. It is apparent that the pilot burner 30 can be located at any point along the axis of the radiant tube heater housing 1.

In operation the blower or fan is started to set up circulation through the combustion chamber between outer tube 1 and air tube 4 of the radiant tube heater and gas is supplied through orifice 23 into the chamber 24 at the end of the premix cone 9. Air drawn in through opening 15 passes through the premix cone around metering disc 22 and premixes with the fuel and becomes ignited as it passes toward the outlet 3 of the combustion chamber. The operator, observing the flame through the site glass 26, will adjust the fuel air ratio by moving the fuel pipe 16 back and forth in the premix cone 9 until the metering disc 22 has established the proper air-fuel ratio. The fuel pipe is then locked in place by the set screw 18 and minor adjustments for fuel-air ratio can be made by operating the air inlet shutter 14 because such individual burner adjustments are necessary if a plurality of radiant tube burners are exhausted by a common fan. By using natural gas at 2.5 p.s.i., 1,000,000 maximum B.t.u. input per hour can be fired.

As shown in FIGURE 1 of the drawing, the burner flames 5a have an air cone 5b in the center thereof. This is the reverse of the usual Bunsen type burner, for example, where the center cone is the fuel cone and the air envelopes the fuel cone to produce the burner flame. By locating the flames 5a in the air tube 4 in a manner to direct the flame to different selected areas of the housing 1, such areas can be made red hot to radiate a maximum amount of heat in a given zone. Such a selection can be made, for example, to heat the side areas of the elliptical shaped housing 1 in FIGURE 4 of the drawing.

Where the housing 1 is cylindrical, as in FIGURE 3, the burner flame can be uniformly distributed around the air tube 4. The perforations 5 may be extended towards the rear of the air tube to insure that all of the combustible material in the fuel stream and products of combustion passing through the outlet 3 are consumed.

It is evident that the fuel gas and air passing to the closed end 24 of the outer housing are preheated because of the counterflow of the products of combustion to outlet 3. The pre-mixed fuel and air traveling from closed end 24 toward outlet 3 through combustion area 7 is pierced by the high velocity air streams at the orifices 5 and the adjacent pre-mix is inspirated into these air streams and burned until the oxygen in the individual air streams is exhausted. The pre-mix passing around the cones of combustion or flames mixes with the products of combustion from the flame and passes on to be pierced by the next row of air orifices 5. Each cone is sharp and distinct and combustion at the last rows of orifices 5 in the air tube 4 takes place to a very low B.t.u. content gas, but the temperature of this gas is high enough for combustion near the exhaust end of the radiant tube burner so that substantially all of the fuel in the pre-mix is consumed.

Although one embodiment of the invention has been herein illustrated and described, it will be evident to those skilled in the art that various modifications may be made in the details of construction without departing from the principles herein set forth.

We claim:

A radiant tube heater having a tube-like housing closed at one end to constitute a premix zone of fuel and air in a combustion chamber, said housing having an air supply tube disposed therein extending substantially the length of said housing and a fuel pipe disposed in said air supply tube said air supply tube having a pre-mix chamber for the fuel and air passing into said combustion chamber and said tube having perforations throughout a portion of the wall thereof to supply secondary air to pierce the pre-mixed fuel and air to produce burner flames and support combustion in the chamber between the housing and air tube and said fuel pipe having a metering disc adjacent the end thereof disposed in said pre-mixed chamber to constitute a valve for varying the flow of air from the air supply pipe to the premix zone, said fuel pipe being adjustable axially to vary the position of said metering disc, the pre-mix chamber of the air supply tube consisting of a cone-shaped tube extending from the end of the air tube back into the air tube and the metering disc being movable within the cone-shaped wall of the tube to vary the area of the annular space between the disc and wall to thereby ratio the volume of air in proportion to the volume of fuel entering the premix zone of the combustion chamber.

References Cited by the Examiner

UNITED STATES PATENTS

| 992,181 | 5/1911 | Foss | 158—118 X |
|---|---|---|---|
| 1,751,533 | 3/1930 | Taylor | 126—360 X |
| 1,791,561 | 2/1931 | Heyn et al. | 158—108 X |
| 1,862,673 | 6/1932 | Foster | 158—109 |
| 1,878,478 | 9/1932 | Ensign et al. | 158—118 |
| 2,041,313 | 5/1936 | Winder | 126—360 X |
| 2,201,385 | 5/1940 | Woodson | 126—91 X |
| 2,255,540 | 9/1941 | Dreffein | 126—91 |
| 2,504,592 | 4/1950 | Scharbaw et al. | 158—115 |

FOREIGN PATENTS

| 556,136 | 4/1957 | Belgium. |
|---|---|---|
| 502,112 | 3/1939 | Great Britain. |
| 537,657 | 7/1941 | Great Britain. |
| 779,669 | 7/1957 | Great Britain. |

FREDERICK KETTERER, *Primary Examiner.*

JAMES W. WESTHAVER, *Examiner.*